(12) United States Patent
Yokoyama

(10) Patent No.: US 10,104,254 B2
(45) Date of Patent: Oct. 16, 2018

(54) IMAGE FORMING APPARATUS AND METHOD FOR CONTROLLING THE IMAGE FORMING APPARATUS

(71) Applicant: CANON KABUSHIKI KAISHA, Tokyo (JP)

(72) Inventor: Junnosuke Yokoyama, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/204,453

(22) Filed: Jul. 7, 2016

(65) Prior Publication Data
US 2017/0013155 A1    Jan. 12, 2017

(30) Foreign Application Priority Data
Jul. 10, 2015    (JP) .................................. 2015-138899

(51) Int. Cl.
*G06F 3/12*    (2006.01)
*H04N 1/00*    (2006.01)

(52) U.S. Cl.
CPC ..... *H04N 1/00891* (2013.01); *H04N 1/00411* (2013.01); *H04N 1/00896* (2013.01); *H04N 2201/0094* (2013.01)

(58) Field of Classification Search
CPC ........... H04N 1/00891; H04N 1/00411; H04N 1/00896
USPC ...................................................... 358/1.13
See application file for complete search history.

(56) References Cited

U.S. PATENT DOCUMENTS

| | | | | |
|---|---|---|---|---|
| 2010/0321711 A1* | 12/2010 | Takahashi | .......... | G03G 15/5004 358/1.9 |
| 2011/0316840 A1* | 12/2011 | Hirata | .................... | G06F 1/3231 345/211 |
| 2013/0010335 A1* | 1/2013 | Baba | .................. | G03G 15/5004 358/3.01 |
| 2013/0073887 A1* | 3/2013 | Miki | ..................... | G06F 1/3231 713/323 |
| 2013/0083344 A1* | 4/2013 | Funakawa | .......... | H04N 1/00127 358/1.13 |
| 2014/0153020 A1* | 6/2014 | Tachikawa | ......... | H04N 1/00336 358/1.13 |

(Continued)

FOREIGN PATENT DOCUMENTS

CN    102478770 A    5/2012
CN    103516941 A    1/2014
(Continued)

*Primary Examiner* — Neil R McLean
(74) *Attorney, Agent, or Firm* — Canon USA Inc., IP Division

(57) ABSTRACT

An image forming apparatus appropriately changes the sensitivity of a human body detection sensor according to its usage environment. The image forming apparatus includes at least a first power state and a second power state that is less in electric power consumption than the first power state, the image forming apparatus including a sensor that detects a heat source present in the vicinity of the image forming apparatus, a control unit configured to shift the image forming apparatus into the first power state from the second power state if the position of the detected heat source satisfies a return condition causing the image forming apparatus to return to the first power state from the second power state, and a changing unit that changes the return condition based on a user operation.

11 Claims, 14 Drawing Sheets

(56) References Cited

U.S. PATENT DOCUMENTS

| | | | |
|---|---|---|---|
| 2014/0157032 A1* | 6/2014 | Yokoyama | G06F 1/3215 |
| | | | 713/323 |
| 2014/0240736 A1* | 8/2014 | Tsongas | H04N 1/00896 |
| | | | 358/1.13 |
| 2015/0346802 A1* | 12/2015 | Nakai | G06F 1/3206 |
| | | | 713/310 |

FOREIGN PATENT DOCUMENTS

| | | |
|---|---|---|
| CN | 104243751 A | 12/2014 |
| JP | 2012-177796 A | 9/2012 |

* cited by examiner

FRONT VIEW

FRONT VIEW

PLAN VIEW

PLAN VIEW

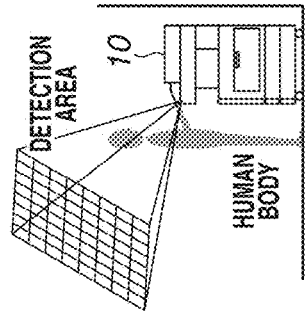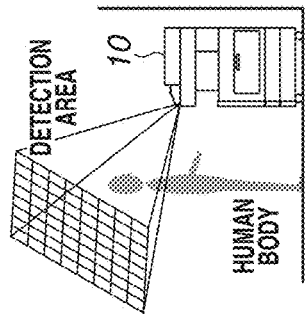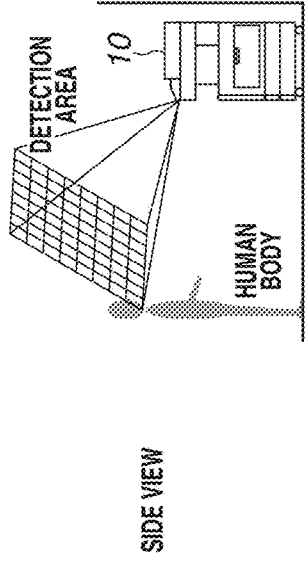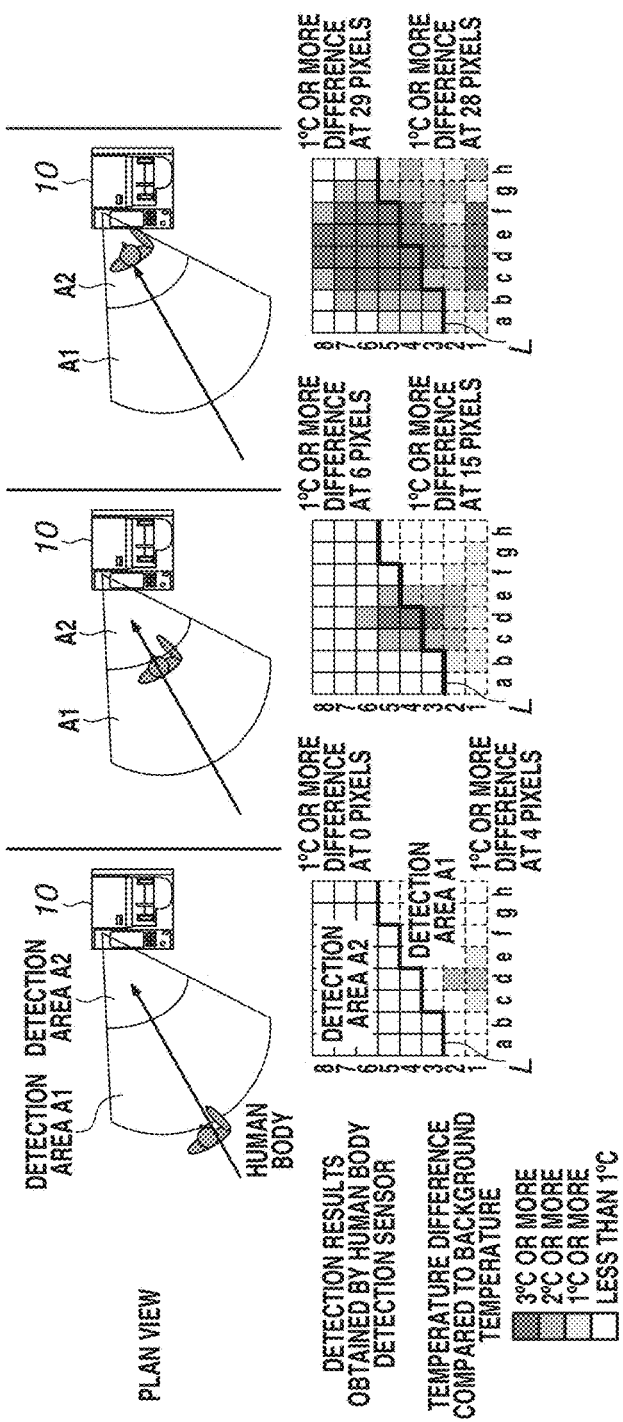

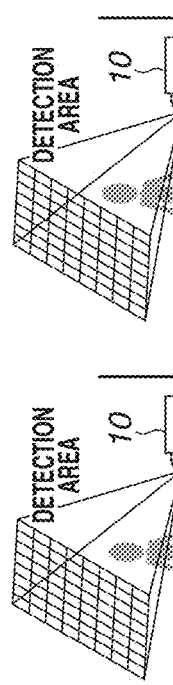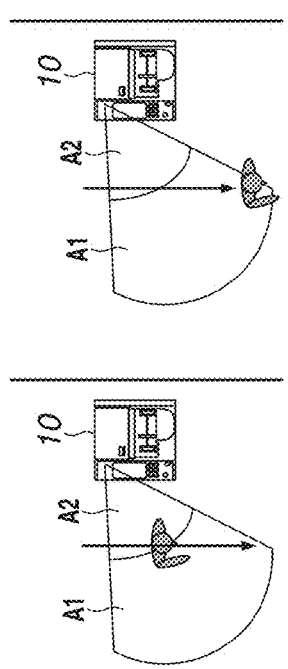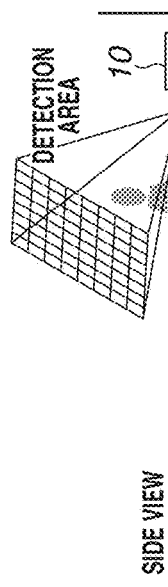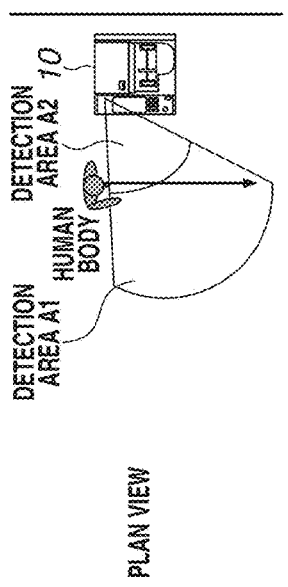

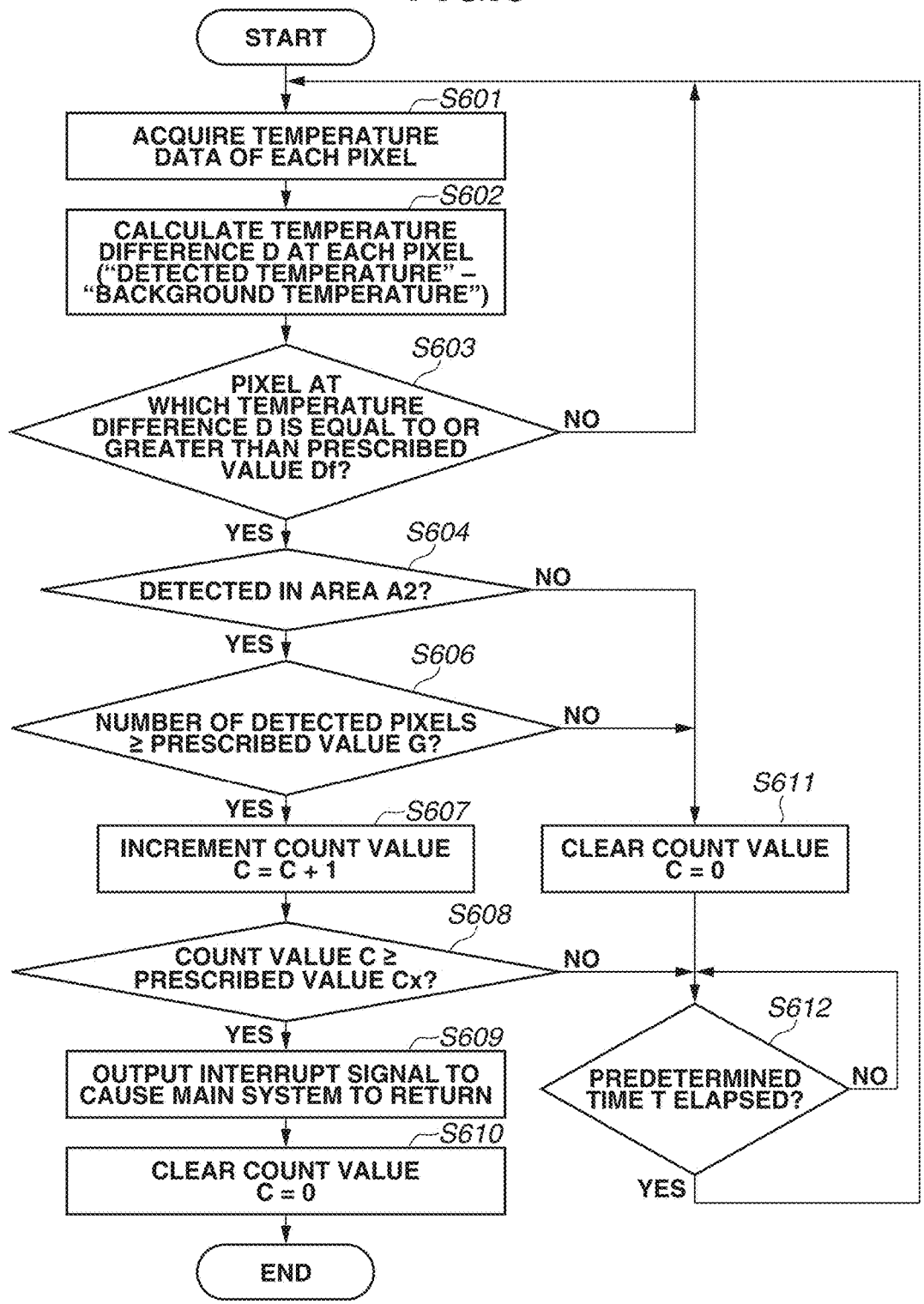

FRONT VIEW

FRONT VIEW

PLAN VIEW

PLAN VIEW

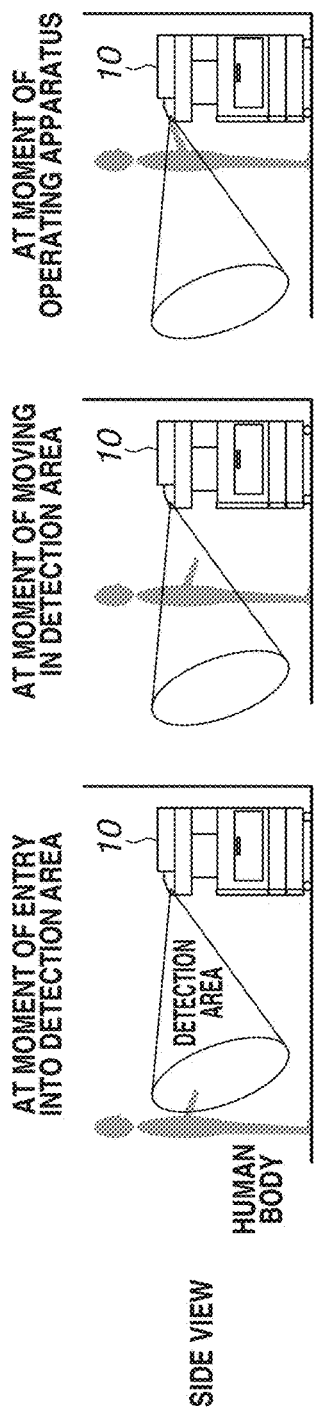

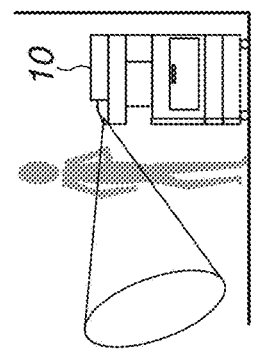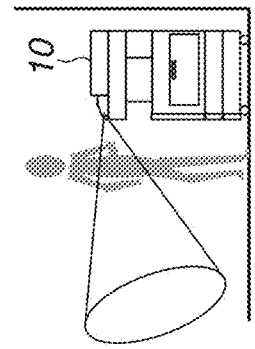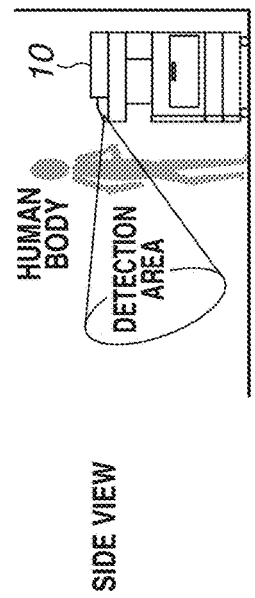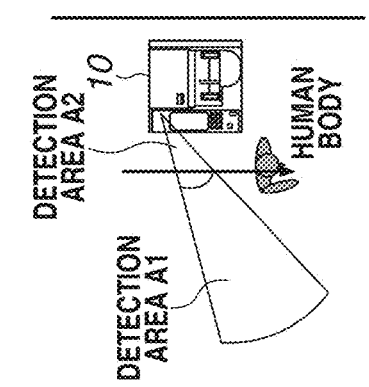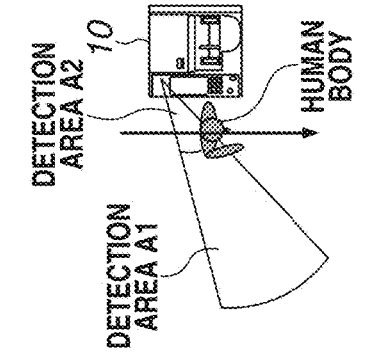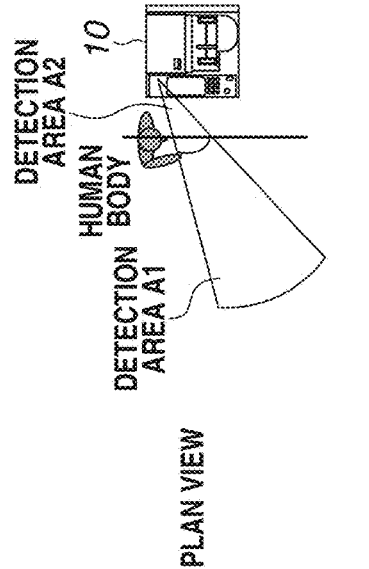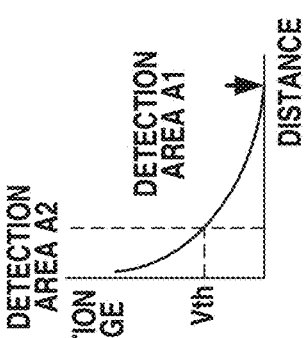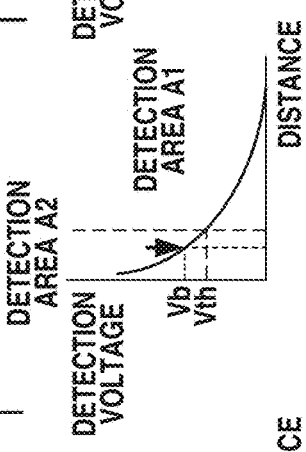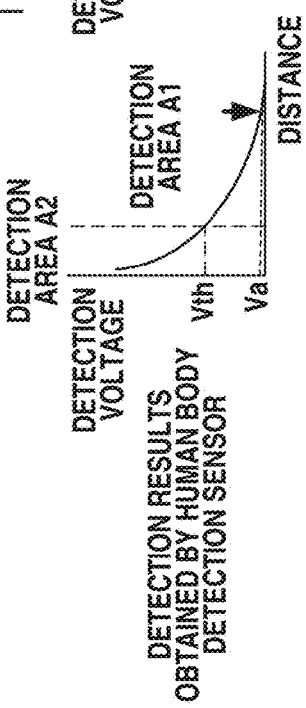
FIG. 13A / FIG. 13B / FIG. 13C

IMAGE FORMING APPARATUS AND METHOD FOR CONTROLLING THE IMAGE FORMING APPARATUS

BACKGROUND

Field

Aspects of the present invention generally relate to an image forming apparatus equipped with a sensor, and also relates to a method for controlling the image forming apparatus.

Description of the Related Art

With increasing social awareness concerning environmental issues, many image forming apparatuses (e.g., copying machines) are configured to automatically shift into a power saving state, e.g., where supplying electric power to a printer unit and a scanner unit is stopped to reduce electric power consumption in a standby state, if they are not operated for a predetermined time.

When a user starts operating an image forming apparatus having shifted into the power saving state, it is necessary for the user to press a button to cause the image forming apparatus to return from the power saving state. Further, the user typically needs to remain in front of the image forming apparatus for a period of time after pressing the button because a significant time lag can occur before the image forming apparatus becomes available. In view of the foregoing, an image forming apparatus can be configured to return from the power saving state automatically when a human body is detected by a human body detection sensor.

For example, as discussed in Japanese Patent Application Laid-Open No. 2012-177796, an image forming apparatus is configured to include two sensors that are different in characteristics. According to the image forming apparatus discussed in Japanese Patent Application Laid-Open No. 2012-177796, a second sensor is delayed in turn-on timing compared to a first sensor. More specifically, the second sensor turns on if a human body enters a detection range of the first sensor. Further, the second sensor is narrower in detection range compared to the first sensor. The image forming apparatus returns from the power saving state if the human body enters the detection range of the second sensor.

However, the image forming apparatus discussed in Japanese Patent Application Laid-Open No. 2012-177796 may cause error detections depending on usage environment thereof. For example, in a case where the image forming apparatus is placed in one corner of a room, most of the persons approaching the image forming apparatus intend to operate the image forming apparatus. However, in a case where an image forming apparatus is placed in a passageway, persons passing in the vicinity of the image forming apparatus can either intend to use the image forming apparatus or can merely be passing by the image forming apparatus. According to the image forming apparatus discussed in Japanese Patent Application Laid-Open No. 2012-177796, the detection range of the second sensor is set to be approximately 0.5 meters (m) to prevent the image forming apparatus from erroneously returning from the power saving state in response to a merely passing by the image forming apparatus.

If the image forming apparatus discussed in Japanese Patent Application Laid-Open No. 2012-177796 is installed in the above-described corner of the room, the image forming apparatus does not return from the power saving state unless each person enters the detection range (0.5 m) of the second sensor even though most of the persons passing in front of the image forming apparatus intend to use the image forming apparatus. If the detection range of the second sensor is widened to provide a wider user detection range, the image forming apparatus may erroneously return when a person merely passes in front of the image forming apparatus in the case where the image forming apparatus is placed in a passageway.

If the image forming apparatus is installed at one corner of a room, users may want to widen the detection range of the human body detection sensor so that the image forming apparatus quickly returns from the power saving state when each user reaches a forward area of the image forming apparatus. Further, if the installation site of the image forming apparatus is a passageway, there will be users who wants to narrow the detection range of the human body detection sensor so that the image forming apparatus is prevented from erroneously returning from the power saving state when a person merely passes in front of the image forming apparatus. More specifically, considering various usage environments of the image forming apparatus, there is a need to appropriately change the sensitivity of the human body detection sensor with reference to usage environment thereof according to a user request.

SUMMARY OF THE INVENTION

Aspects of the present invention are generally directed to a technique that appropriately changes the sensitivity of a human body detection sensor according to a usage environment of an image forming apparatus.

According to an aspect of the present invention, an image forming apparatus including at least a first power state and a second power state that is lower in electric power consumption than the first power state includes a detection unit configured to detect a heat source, a control unit configured to cause the image forming apparatus to shift into the first power state from the second power state if a detection result satisfies a predetermined return condition that causes the image forming apparatus to return to the first power state from the second power state, a display unit that displays a screen to accept a user operation to change the return condition, and a changing unit configured to change the return condition based on the accepted user operation.

Further features of aspects of the present invention will become apparent from the following description of exemplary embodiments with reference to the attached drawings.

BRIEF DESCRIPTION OF THE DRAWINGS

FIGS. 4A, 4B, and 4C illustrate detection results obtained by the human body detection sensor when a human body has moved toward the image forming apparatus.

FIGS. 5A, 5B, and 5C illustrate detection results obtained by the human body detection sensor when a human body has passed in front of the image forming apparatus.

FIG. 6 is a flowchart illustrating determination processing performed by a microcomputer.

FIGS. 12A, 12B, and 12C illustrate detection results obtained by the human body detection sensor when a human body has moved toward the image forming apparatus.

FIGS. 13A, 13B, and 13C illustrate detection results obtained by the human body detection sensor when a human body has passed in front of the image forming apparatus.

DESCRIPTION OF THE EMBODIMENTS

Exemplary embodiments of the present invention will be described in detail below with reference to the attached drawings.

Figure 1:
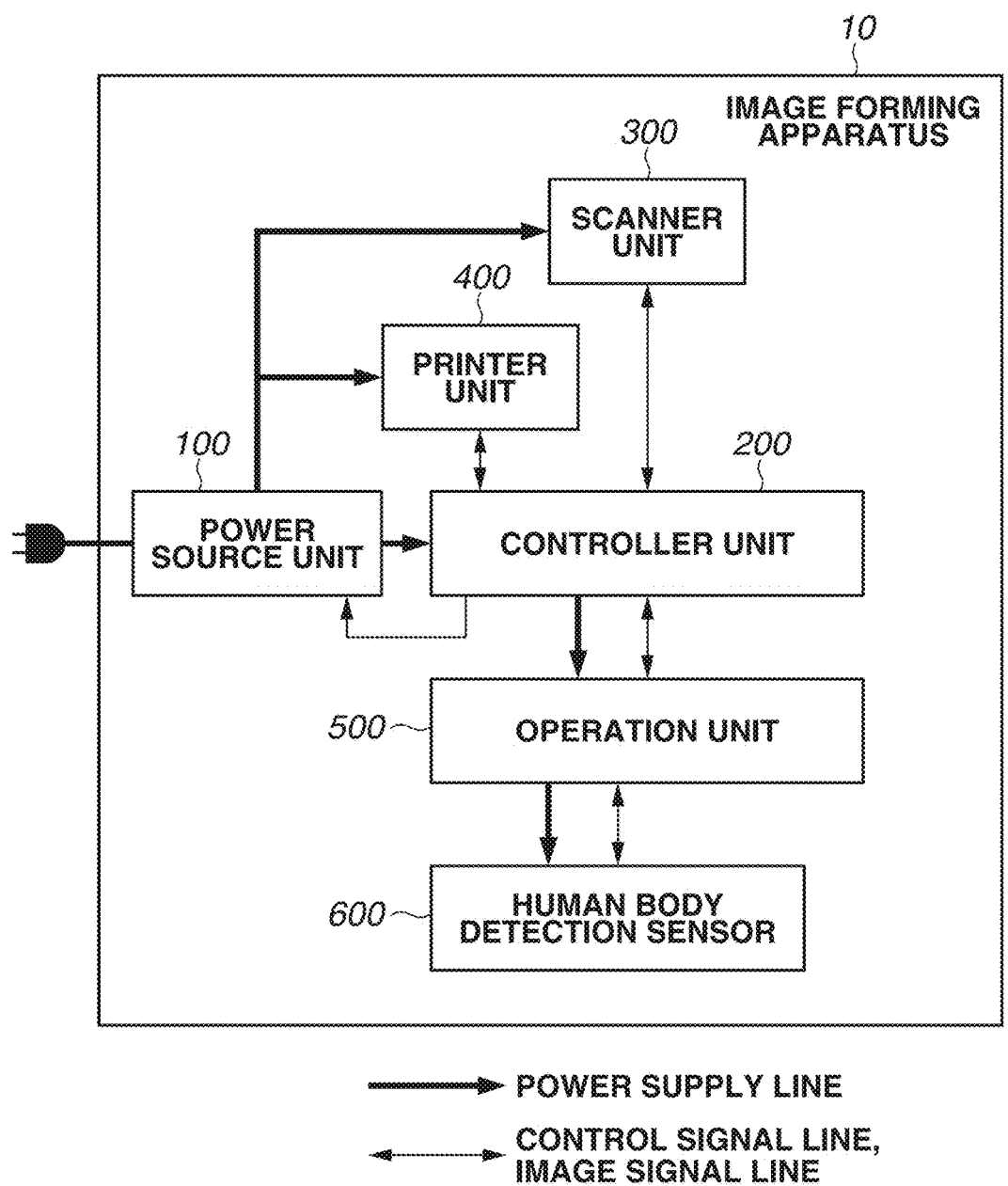
FIG. 1 is a block diagram schematically illustrating an image forming apparatus.

Hereinafter, a first exemplary embodiment will be described. FIG. 1 is a block diagram schematically illustrating an image forming apparatus 10. The image forming apparatus 10 is a multi function peripheral (MFP) that has a plurality of functions, such as a print function, a scanner function, a copy function, and a facsimile (FAX) function.

The image forming apparatus 10 includes a power source unit 100, a controller unit 200, a scanner unit 300, a printer unit 400, an operation unit 500, and a human body detection sensor 600. The image forming apparatus 10 is operable in an ordinary power state in which the image forming apparatus 10 can perform various functional operations (including a copy operation) and is also operable in a power saving state in which electric power consumption is smaller compared to the ordinary power state. The power state of the image forming apparatus 10 is not limited to the ordinary power state and the power saving state. The image forming apparatus 10 shifts into the power saving state from the ordinary power state if a predetermined condition that causes the image forming apparatus 10 to shift into the power saving state is satisfied. For example, the image forming apparatus 10 shifts into the power saving state (1) when the operation unit 500 is not operated by a user for a predetermined time and a print job is not received from an external apparatus for a predetermined time, or (2) when a power saving button 512 (see FIG. 2) is pressed by a user.

When the power state is the power saving state, electric power supply to the scanner unit 300 and the printer unit 400 is stopped. On the other hand, even in the power saving state, electric power is continuously supplied to the human body detection sensor 600. If it is determined that a user of the image forming apparatus 10 is present based on a detection result obtained by the human body detection sensor 600, the image forming apparatus 10 returns to the ordinary power state from the power saving state.

Figure 2:
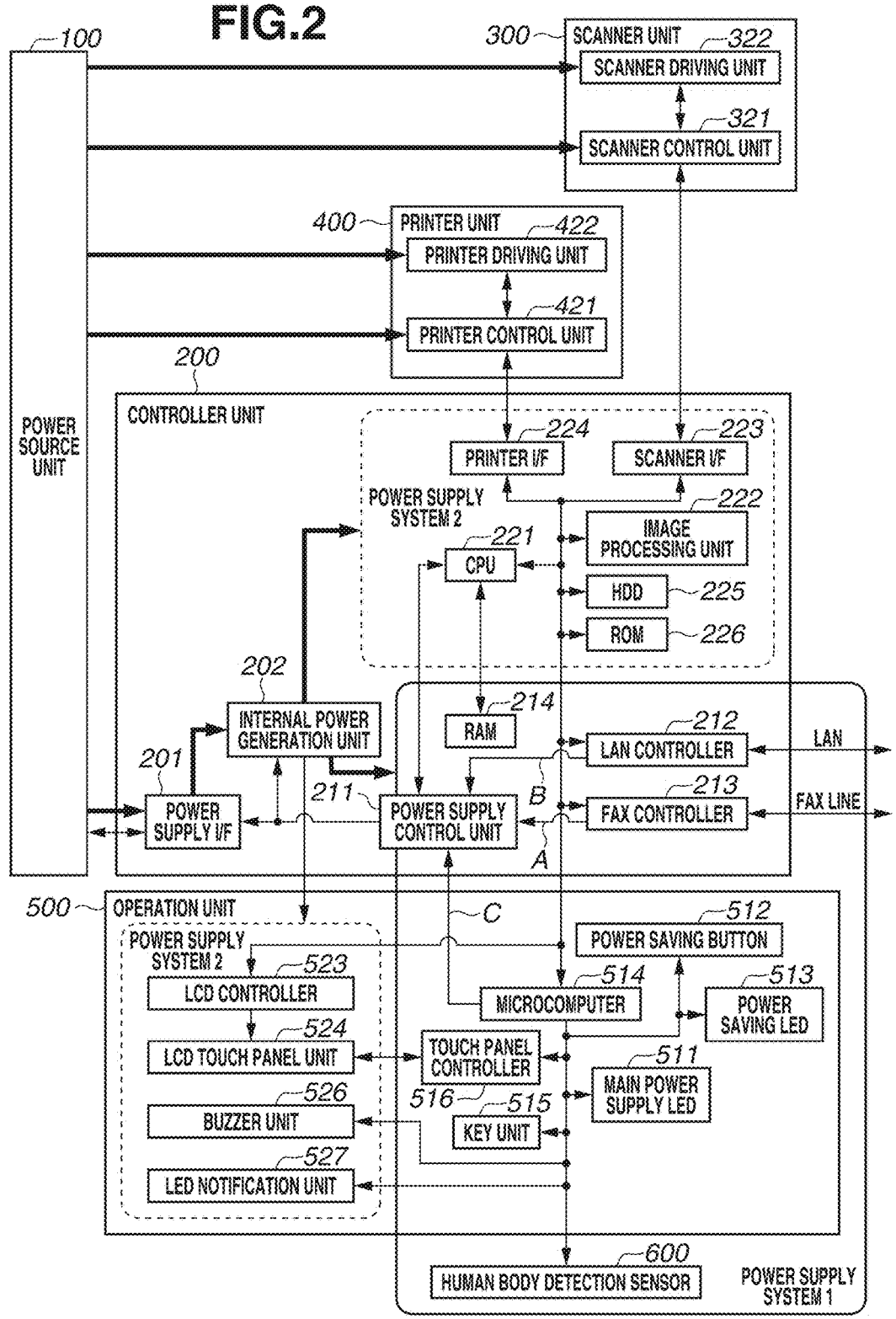
FIG. 2 is a block diagram illustrating details of the image forming apparatus.

FIG. 2 is a block diagram illustrating details of the image forming apparatus 10.

The scanner unit 300 can optically read an image from an original document and can generate digital image data of the read image. The scanner unit 300 includes a scanner control unit 321 and a scanner driving unit 322. The scanner driving unit 322 includes a reading head configured to read an original document, a motor configured to move the reading head, and a conveyance unit configured to convey the document to a reading position. The scanner control unit 321 can control the behavior of the scanner driving unit 322. More specifically, the scanner control unit 321 receives setting information (i.e., information having been set by a user to perform scanner processing) through communications with the controller unit 200, and controls the behavior of the scanner driving unit 322 based on the setting information.

The printer unit 400 can form an image on a paper according to an electrophotographic method. The printer unit 400 includes a printer driving unit 422 and a printer control unit 421. The printer driving unit 422 includes a motor that can rotate a photosensitive drum, a mechanism unit that can press a fixing device, and a heater that can heat the fixing device. The printer control unit 421 can control the printer driving unit 422. The printer control unit 421 receives setting information having been set by a user to perform print processing through communications with the controller unit 200, and controls the behavior of the printer driving unit 422 based on the setting information.

The controller unit 200 is connected to and can communicate with the scanner unit 300, the printer unit 400, the operation unit 500, and the power source unit 100. The controller unit 200 can control behaviors of the scanner unit 300, the printer unit 400, the operation unit 500, and the power source unit 100. The controller unit 200 can perform image processing on image data of an image read by the scanner unit 300 or image data received via a FAX line, and can output the processed image data to the printer unit 400. Further, the controller unit 200 can control behaviors of the scanner unit 300 and the printer unit 400 according to user instructions input via the operation unit 500. Further, the controller unit 200 can control the power state (e.g., the ordinary power state, the power saving state, etc.) of the image forming apparatus 10 by controlling the power source unit 100.

The controller unit 200 includes a power supply interface (hereinafter, referred to as "power supply I/F") 201 and an internal power generation unit 202. The internal power generation unit 202 can selectively generate electric power to be supplied to devices belonging to a power supply system 1 and electric power to be supplied to devices belonging to a power supply system 2. When the power state is the power saving state, the internal power generation unit 202 stops supplying electric power to the devices belonging to the power supply system 2, such as the scanner unit 300 and the printer unit 400, although the internal power generation unit 202 continuously supplies electric power to the devices belonging to the power supply system 1. Therefore, electric power consumption in the power saving state can be reduced. Further, when the power state is the ordinary power state, the internal power generation unit 202 supplies electric power to the devices belonging to the power supply system 1 and the devices belonging to the power supply system 2, such as the scanner unit 300 and the printer unit 400.

Further, the controller unit 200 includes a central processing unit (CPU) 221, an image processing unit 222, a scanner interface (hereinafter, referred to as "scanner I/F") 223, a printer interface (hereinafter, referred to as "printer I/F") 224, a hard disk drive (HDD) 225, and a read only memory (ROM) 226. The CPU 221, the image processing unit 222, the scanner I/F 223, the printer I/F 224, the HDD 225, and the ROM 226 belong to the power supply system 2.

Further, the controller unit 200 includes a power supply control unit 211, a local area network (LAN) controller 212, a FAX controller 213, and a random access memory (RAM) 214. The power supply control unit 211, the LAN controller 212, the FAX controller 213, and the RAM 214 belong to the power supply system 1. The LAN controller 212 and the FAX controller 213, which belong to the power supply system 1, can detect a return factor that causes the image forming apparatus 10 to return to the ordinary power state from the power saving state. When the FAX controller 213 receives facsimile data via a telephone line, the FAX controller 213 outputs an interrupt signal A to the power supply control unit 211. Further, when the LAN controller 212 receives a print request or a device state confirmation request from an external apparatus via a LAN, the LAN controller 212 outputs an interrupt signal B to the power supply control unit 211.

Further, the operation unit 500 includes a liquid crystal display (LCD) touch panel unit 524, an LCD controller 523, a buzzer unit 526, and a light-emitting diode (LED) notification unit 527. The LCD touch panel unit 524 includes an LCD panel and a touch panel that are integrated with each other. The LCD controller 523 can receive image data from the CPU 221 of the controller unit 200 and can display the received image data on the LCD panel of the LCD touch panel unit 524. The buzzer unit 526 can generate sounds to notify a user of print completion. The LED notification unit 527 can cause an LED to turn on to notify a user of an operational state (e.g., job execution in progress or error occurrence) of the image forming apparatus 10. The LCD touch panel unit 524, the LCD controller 523, the buzzer unit 526, and the LED notification unit 527 belong to the power supply system 2.

Further, the operation unit 500 includes a main power supply LED 511, the power saving button 512, a microcomputer 514, a key unit 515, and a touch panel controller 516. The main power supply LED 511 turns on when a main power source of the image forming apparatus 10 is activated. The power saving button 512 is a button operable to cause the image forming apparatus 10 to shift into the ordinary power state from the power saving state or cause the image forming apparatus 10 to shift into the power saving state from the ordinary power state. The key unit 515 includes ten keys operable to designate the number of papers to be printed and a start key operable to instruct starting a printing operation. The main power supply LED 511, the power saving button 512, the microcomputer 514, the key unit 515, the touch panel controller 516 belong to the power supply system 1. The power saving button 512, which belongs to the power supply system 1, can detect the return factor that causes the image forming apparatus 10 to return to the ordinary power state from the power saving state. The microcomputer 514 can output an interrupt signal C when the power saving button 512 accepts a user operation.

The touch panel controller 516 can acquire coordinate data indicating the position touched by a user from the touch panel of the LCD touch panel unit 524. The touch panel controller 516 can notify the microcomputer 514 of the acquired coordinate data. Further, the microcomputer 514 can periodically perform processing for polling a user operation input via the key unit 515. Then, if the microcomputer 514 detects the user operation input via the key unit 515, the microcomputer 514 notifies the CPU 221 of the pressed key of the key unit 515.

The human body detection sensor 600 is a sensor that can detect a user of the image forming apparatus 10. The human body detection sensor 600 is an infrared array sensor that includes a plurality of infrared ray receiving elements disposed in an 8×8 lattice pattern. Each infrared ray receiving element can receive infrared rays emitted from a target object and can output a detection result indicating the intensity of the received infrared rays. The detection result acquired from each infrared ray receiving element is data representing the temperature of the target object. The microcomputer 514 acquires temperature data from each of the plurality of infrared ray receiving elements at a predetermined interval. The predetermined interval is, for example, 100 milliseconds (ms). The predetermined interval is referred to as "frame." An assembly of temperature data acquired by the microcomputer 514 from the plurality of infrared ray receiving elements during one frame is referred to as "temperature distribution data." In other words, the microcomputer 514 acquires a piece of temperature distribution data for each frame.

According to the above-mentioned example, electric power is continuously supplied to the microcomputer 514 in the power saving state. Alternatively, it is feasible to supply electric power to the microcomputer 514 only when it acquires temperature data from the human body detection sensor 600. Further, it is feasible to supply electric power to the microcomputer 514 if the temperature detected by any one of the infrared ray receiving elements of the human body detection sensor 600 is equal to or higher than a predetermined value. In these cases, the electric power consumption in the power saving state can be further reduced.

The microcomputer 514 processes a plurality of pieces of temperature distribution data acquired from the human body detection sensor 600 and determines whether a user of the image forming apparatus 10 is present. If the microcomputer 514 determines that the user of the image forming apparatus 10 is present, the microcomputer 514 outputs the interrupt signal C to the power supply control unit 211. If the interrupt signal C is input, the power supply control unit 211 controls the power source unit 100 in such a way as to cause the image forming apparatus 10 to return to the ordinary power state from the power saving state. In the present exemplary embodiment, the image forming apparatus 10 shifts into the ordinary power state from the power saving state, as described above. However, the power state of the destination shifting from the power saving state is not limited to the ordinary power state and can be any other power state in which electric power consumption is higher than that in the power saving state. For example, the power state of the destination shifting from the power saving state may be a power state in which electric power supply to the printer unit 400 and the scanner unit 300 is stopped and electric power can be supplied to the devices belonging to the power supply system 1 and the devices belonging to the power supply system 2.

According the example described in the present exemplary embodiment, the power source unit 100 is controlled by the power supply control unit 211. As another example, the microcomputer 514 may be configured to control the power source unit 100 directly.

Further, as described above, the power supply control unit 211 supplies electric power to the scanner unit 300 and the printer unit 400 if the interrupt signal A, B, or C is input. However, aspects of the present invention are not limited to the above-mentioned example. For example, the power supply control unit 211 may be configured to supply no electric power to the scanner unit 300 and the printer unit 400 when the interrupt signal A, B, or C is input, although the power supply control unit 211 supplies electric power to the devices belonging to the power supply system 2. Further, in aspects of the present invention, the power supply control unit 211 may be configured to select each device to which electric power should be supplied according to the type of input interrupt signal. For example, if the input signal is the interrupt signal A or B, the power supply control unit 211 supplies electric power to the devices belonging to the power supply system 2 and the printer unit 400 and does not supply electric power to the scanner unit 300. In this case, it is feasible to prevent electric power from being supplied to the scanner unit 300 when the detected return factor is the print request or the reception of facsimile data that does not require the scanner unit 300. Further, if the input signal is the interrupt signal C, the power supply control unit 211 supplies electric power to the devices belonging to the power supply system 2 and does not supply electric power to the printer unit 400 and the scanner unit 300. In this case, it is feasible to prevent electric power from being supplied to the scanner unit 300 and the printer unit 400 before the function of the image forming apparatus 10 to be used is identified by the user.

If electric power is supplied to the CPU 221 in response to the interrupt signal A, B, or C, the CPU 221 reads the previous state (i.e., the state where the image forming apparatus 10 has not yet shifted into the power saving state) from the RAM 214 being in a self refresh state, to cause the image forming apparatus 10 to shift into the previous state. Thus, the image forming apparatus 10 returns to the previous state in which the image forming apparatus 10 has not yet shifted into the power saving state.

FIGS. 3A, 3B, 3C, and 3D illustrate a detection area of the human body detection sensor.

The human body detection sensor provided for the image forming apparatus 10 is the infrared ray array sensor including a plurality of infrared ray receiving elements disposed in the 8×8 lattice pattern.

The microcomputer 514 acquires temperature data from each infrared ray receiving element and determines whether a heat source is present based on temperature distribution data (i.e., an assembly of the acquired temperature data). More specifically, the microcomputer 514 checks the presence of a heat source with reference to the difference between background temperature data indicating the ambient temperature of the image forming apparatus 10 and the temperature distribution data acquired from the human body detection sensor 600. The above-mentioned background temperature data is temperature distribution data acquired by the human body detection sensor 600 at the time when it is determined that there is not any human body in the vicinity of the image forming apparatus 10. For example, the microcomputer 514 acquires the background temperature data at the time when the image forming apparatus 10 shifts into the power saving state when a predetermined time has elapsed without receiving any user operation.

Figure 3A:
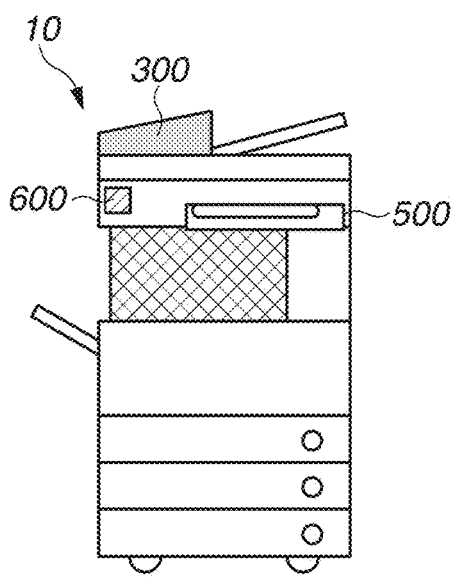
FIGS. 3A, 3B, 3C, and 3D illustrate a detection area of a human body detection sensor.
Figure 3C:
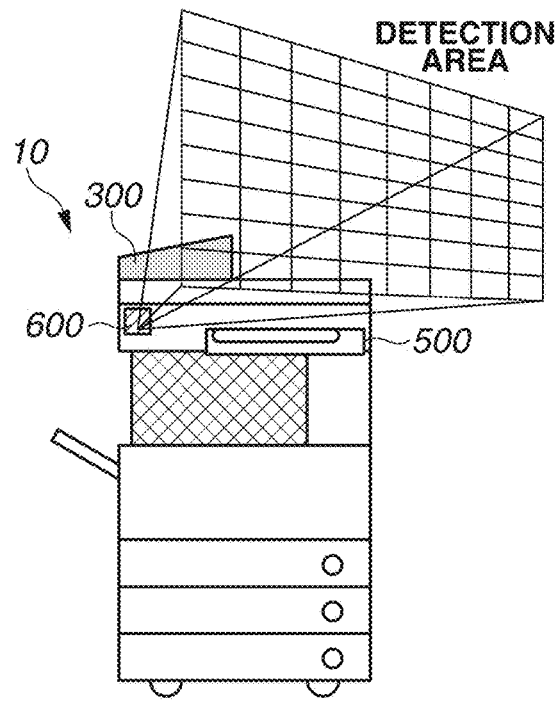
Figure 3B:
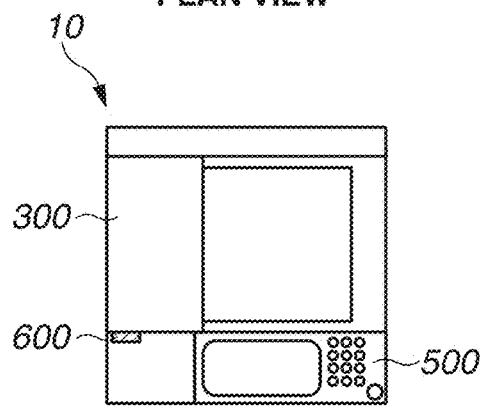
Figure 3D:
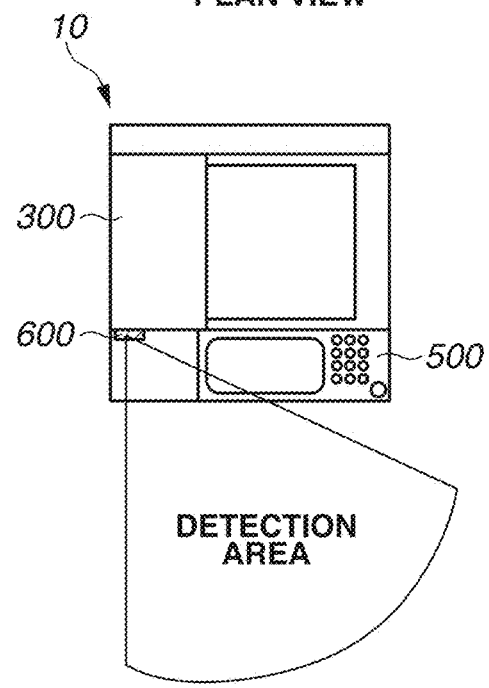

As illustrated in FIGS. 3A, 3B, 3C, and 3D, in the present exemplary embodiment, the human body detection sensor 600 is directed toward a face (i.e., an exposed skin) in such a way as to surely detect human body temperature. More specifically, the human body detection sensor 600 is positioned at a height that is substantially similar to the height of the operation unit 500 and is disposed in such a way as to face obliquely upward. FIGS. 3C and 3D illustrate the detection area of the human body detection sensor 600. Each rectangle illustrated in FIG. 3C indicates the detection area of an infrared ray receiving element.

FIGS. 4A, 4B, and 4C illustrate detection results obtained by the human body detection sensor when a human body has moved toward the image forming apparatus 10. FIGS. 4A, 4B, and 4C include side views located at the upper parts thereof, each illustrating a positional relationship between the image forming apparatus 10 and the human body. Further, FIGS. 4A, 4B, and 4C include plan views located at the middle parts thereof, each illustrating the positional relationship between the image forming apparatus 10 and the human body. Further, FIGS. 4A, 4B, and 4C include matrices located at the lower parts thereof, each illustrating detection results obtained by the human body detection sensor at respective positions of the human body.

The human body detection sensor includes 64 infrared ray receiving elements that are disposed in the 8×8 lattice pattern. In the following description, each of respective elements 1a to 8h constituting the matrix represents the position of each infrared ray receiving element. For example, the element 1a represents an element disposed at the first row in the column "a". The element 8h represents an element disposed at the eighth row in the column "h".

The detection area of the human body detection sensor 600 includes a detection area A1 positioned far from the image forming apparatus 10, and a detection area A2 that is closer to the image forming apparatus 10 compared to the detection area A1. A zigzag line L extending from the second row to the fifth row in the lower parts of FIGS. 4A, 4B, and 4C is the boundary between the detection area A1 and the detection area A2. Even if a heat source is present in the detection area A1, the image forming apparatus 10 does not immediately return from the power saving state. The image forming apparatus 10 returns from the power saving state if a heat source is present in the detection area A2, and the heat source stays in the detection area A2 continuously for a predetermined time. If the heat source position satisfies the above-mentioned return condition, the image forming apparatus 10 returns from the power saving state. The condition to cause the image forming apparatus 10 to return from the power saving state is not limited to the above-mentioned condition.

If a plurality of elements in which the detected temperature is equal to or higher than a predetermined temperature is present in a concentrated manner, the microcomputer 514 determines that a heat source is present. More specifically, if any one of eight pixels positioned around one heat source pixel in which the detected temperature is equal to or higher than the predetermined temperature is another heat source pixel in which the detected temperature is equal to or higher than the predetermined temperature, the microcomputer 514 determines that a heat source is present. Then, the microcomputer 514 identifies the region corresponding to the identified heat source pixels as the heat source.

The above-mentioned heat source pixel is a pixel at which the difference between temperature data acquired from the infrared ray receiving element and the background temperature data is equal to or greater than 1° C. Although the threshold value is set to 1° C. in the present exemplary embodiment, the threshold value is not limited to 1° C. and may be any other value.

FIG. 4A illustrates a state where a human body has just entered the detection area of the human body detection sensor 600. As illustrated in the lower part of FIG. 4A, elements 1c, 1d, 1e, and 2d positioned in the bottom area of the human body detection sensor 600 are heat source pixels. In the state illustrated in FIG. 4A, four heat source pixels are present in the detection area A1 and no heat source pixel is present in the detection area A2. Therefore, at this moment, the image forming apparatus 10 holds the power saving state.

If the user further approaches the image forming apparatus 10 and reaches the detection area A2, an increased number of heat source pixels are present in a wider region extending from the first row to the sixth row, as illustrated in FIG. 4B. Further, when seen in the right and left direction, the heat source pixels are present in a region expanded from the column "d" to the column "b" and from the column "d" to the column In the state illustrated in FIG. 4B, fifteen heat source pixels are present in the detection area A1 and six heat source pixels are present in the detection area A2. Because a plurality of heat source pixels is present in the detection area A2, the image forming apparatus 10 returns from the power saving state if the plurality of heat source pixels stays in the detection area A2 continuously for the predetermined time (e.g., 0.5 second (sec)).

If the user further approaches the image forming apparatus 10, almost all pixels of the human body detection sensor 600 become heat source pixels, as illustrated in FIG. 4C.

FIGS. 5A, 5B, and 5C illustrate detection results obtained by the human body detection sensor when a human body has moved and passed in front of the image forming apparatus 10. FIGS. 5A, 5B, and 5C include side views located at the upper parts thereof, each illustrating a positional relationship between the image forming apparatus and the human body. Further, FIGS. 5A, 5B, and 5C include plan views located at the middle parts thereof, each illustrating the positional relationship between the image forming apparatus 10 and the human body. Further, FIGS. 5A, 5B, and 5C include matrices located at the lower parts thereof, each illustrating detection results obtained by the human body detection sensor at respective positions of the human body.

FIG. 5A illustrates a state where a pedestrian has just entered the detection area of the human body detection sensor 600. When the pedestrian approaches the image forming apparatus 10 from a side thereof, elements 2h to 8h, 4g to 7g, and 6f (i.e., elements positioned on the right side of the human body detection sensor 600) become heat source pixels. In the state illustrated in FIG. 5A, six heat source pixels are present in the detection area A2. At this moment, a plurality of heat source pixels is not present in the detection area A2 continuously for the predetermined time (e.g., 0.5 sec). Therefore, the image forming apparatus 10 holds the power saving state.

FIG. 5B illustrates a state where the pedestrian is walking in the forward area of the image forming apparatus 10. As illustrated in FIG. 5B, when the pedestrian passes in front of the image forming apparatus 10, the heat source pixel area moves in the direction from the column "h" to the column "a." Further, immediately before the pedestrian goes out of the detection area, only the pixel 1a of the column "a" can be recognized as the heat source pixel as illustrated in FIG. 5C.

According to the examples illustrated in FIGS. 5A, 5B, and 5C, when a pedestrian passes in front of the image forming apparatus 10, a plurality of heat source pixels appears in the detection area A2 and then the plurality of heat source pixels disappears from the detection area A2 before the predetermined time elapses. Therefore, the image forming apparatus 10 holds the power saving state.

FIG. 6 is a flowchart illustrating determination processing performed by the microcomputer 514.

First, in step S601, the microcomputer 514 acquires temperature data detected by each infrared ray receiving element of the human body detection sensor 600. In the present exemplary embodiment, the microcomputer 514 acquires temperature distribution data from the human body detection sensor 600 for each frame (100 ms). Then, in step S602, the microcomputer 514 compares the acquired temperature distribution data with the background temperature data. More specifically, the microcomputer 514 calculates a temperature difference D, which is the difference between the acquired temperature data and the background temperature data, for each pixel. In step S603, the microcomputer 514 determines whether the calculated temperature difference D is equal to or greater than a prescribed temperature value Df. A setting value of the prescribed temperature difference Df is, for example, 1° C. More specifically, a pixel at which the difference between the ambient temperature (room temperature) of the image forming apparatus 10 and the human body temperature is equal to or greater than 1° C. is recognized as a heat source pixel. If the pixel at which the temperature difference D is equal to or greater than 1° C. is not detected (No in step S603), the operation returns to step S601 to perform the processing for acquiring the temperature data detected by each infrared ray receiving element again.

The background temperature data may be a single temperature value that indicates an average value of the ambient temperature of the image forming apparatus 10 or may be temperature distribution data acquired by the human body detection sensor 600 at predetermined timing. If the pixel at which the temperature difference D is equal to or greater than 1° C. is not detected, an assembly of temperature data acquired by the human body detection sensor 600 may be regarded as the background temperature data.

If the pixel at which the temperature difference D is equal to or greater than 1° C. is detected (Yes in step S603), then in step S604, the microcomputer 514 determines whether the heat source pixel is a pixel belonging to the detection area A2. If a heat source pixel is present in the detection area A2 (Yes in step S604), then in step S606, the microcomputer 514 determines whether the number of heat source pixels that are present in the detection area A2 is equal to or greater than a prescribed value G. For example, the prescribed value G is 2. Namely, in step S606, the microcomputer 514 determines whether at least two heat source pixels are present in the detection area A2.

If the value of the prescribed value G is reduced, it is feasible to cause the image forming apparatus 10 to return from the power saving state quickly even when a human body is far from the image forming apparatus 10. However, the image forming apparatus 10 may erroneously return from the power saving state when a small heat source, such as an electric bulb, turns on. In the present exemplary embodiment, the microcomputer determines whether at least two heat source pixels are present in the detection area A2.

If the microcomputer 514 determines that a plurality of heat source pixels is present in the detection area A2 (Yes in step S606), then in step S607, the microcomputer 514 increments a count value C by one. Then, if the microcomputer 514 determines that the count value C is equal to or greater than a prescribed value Cx (Yes in step S608), then in step S609, the microcomputer 514 outputs the interrupt signal C. Accordingly, the image forming apparatus 10 returns to the ordinary power state from the power saving state. Then, in step S610, the microcomputer 514 clears the count value C.

If the determination result is No in steps S604 and S606, then in step S611, the microcomputer 514 clears the count value C.

If it is determined that the count value C is less than the prescribed value Cx (No in step S608), then in step S612, the microcomputer 514 determines whether a predetermined time T has elapsed. If it is determined that the predetermined time T has elapsed (Yes in step S612), then in step S601, the microcomputer performs the processing for acquiring the temperature data detected by each pixel again. For example, the predetermined time T is 0.1 sec. The predetermined time T is an interval at which the microcomputer 514 acquires temperature data from the infrared ray array sensor 600.

Acquiring detailed temperature data is feasible by reducing the interval, although the load of the microcomputer 514 increases.

In the present exemplary embodiment, a user can select a desired setting value with respect to the sensitivity of the human body detection sensor 600 to change the prescribed value Cx of the count value C. A default value of the prescribed value Cx is 5. More specifically, the microcomputer 514 acquires temperature data at the interval of 0.1 ms and, if a plurality of heat source pixels is present in the detection area A2, the microcomputer 514 increments the count value C at the interval of 0.1 ms. Then, in the present exemplary embodiment, if a target heat source pixel stays in the detection area A2 continuously for 0.5 ms, the microcomputer 514 outputs the interrupt signal C. The horizontal width of the image forming apparatus 10 is approximately 62 cm. In other words, the time required for a person to pass in front of the image forming apparatus 10 is approximately 0.5 sec when the average walking speed (=1.25 m/s) is taken into consideration. Therefore, in the present exemplary embodiment, the default value of the prescribed value Cx is set to 0.5 to cause the image forming apparatus 10 to return from the power saving state if the heat source pixel stays in the detection area A2 for a period of time not shorter than 0.5 sec.

Figure 7:
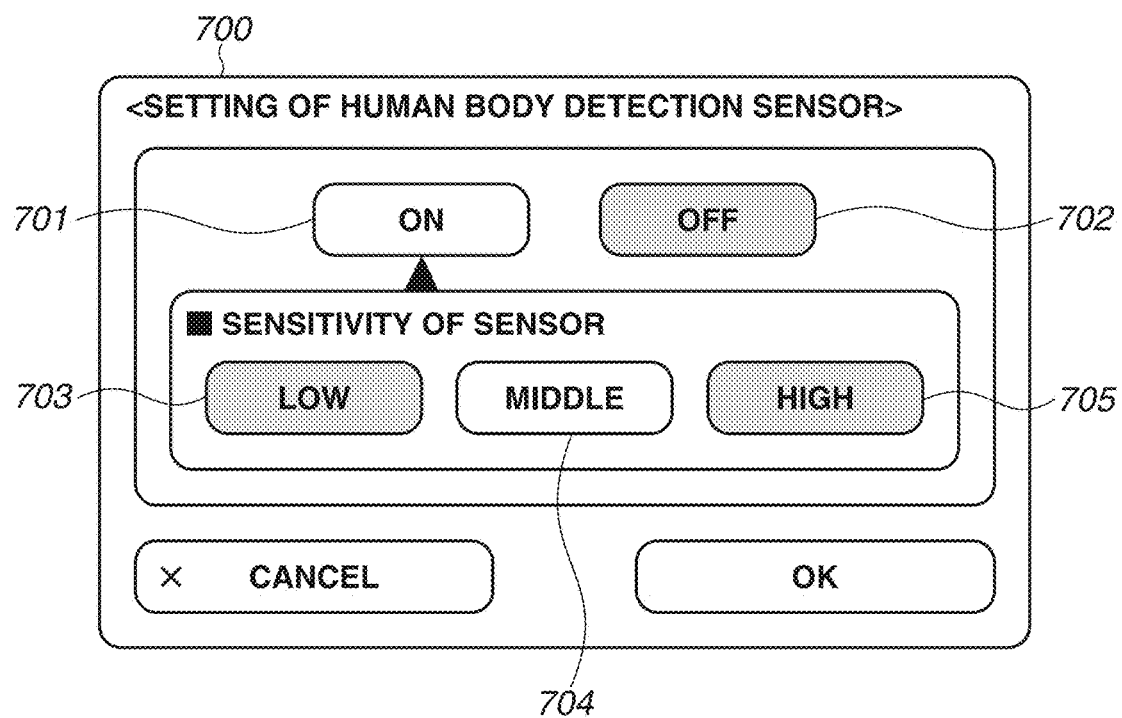
FIG. 7 illustrates a screen that allows a user to set the sensitivity of the human body detection sensor.

FIG. 7 illustrates an exemplary screen 700 that enables a user to set the sensitivity of the human body detection sensor.

The sensitivity setting screen 700 includes an ON button 701 that is operable to enable the function of causing the image forming apparatus 10 to return from the power saving state based on a detection result acquired by the human body detection sensor 600. The sensitivity setting screen 700 includes an OFF button 702 that is operable to disable the above-mentioned function. Further, the sensitivity setting screen 700 includes a LOW button 703, a MIDDLE button 704, and a HIGH button 705, each of which is operable to set the sensitivity of the human body detection sensor 600. Therefore, the user can select any one of "low level", "middle level", and "high level" as the sensitivity of the human body detection sensor 600.

In the present exemplary embodiment, the prescribed value Cx is variable according to the selected sensitivity setting button. More specifically, if the sensitivity setting button selected by the user is the LOW button 703, the prescribed value Cx is 8. In this case, if a plurality of heat source pixels stays in the detection area A2 continuously for 0.8 sec, the microcomputer 514 outputs the interrupt signal C. If the sensitivity setting button selected by the user is the MIDDLE button 704, the prescribed value Cx is 5. In this case, if a plurality of heat source pixels stays in the detection area A2 continuously for 0.5 sec, the microcomputer 514 outputs the interrupt signal C. Further, if the sensitivity setting button selected by the user is the HIGH button 705, the prescribed value Cx is 3. In this case, if a plurality of heat source pixels stays in the detection area A2 continuously for 0.3 sec, the microcomputer 514 outputs the interrupt signal C.

As mentioned above, if the button pressed by the user is the LOW button 703, it is feasible to suppress the occurrence of erroneous return when pedestrians pass in front of the image forming apparatus 10, although the timing the image forming apparatus 10 returns to the ordinary power state is delayed by 0.3 sec compared to the case where the default value 5 is set. Further, if the button pressed by the user is the HIGH button 705, the image forming apparatus 10 can return to the ordinary power state quickly (0.2 sec earlier) compared to the case where the default value 5 is set. However, the erroneous return may occur frequently when pedestrians pass in front of the image forming apparatus 10.

Accordingly, in a case where the image forming apparatus 10 is placed at a corner of a room, such as "office automation (OA) device area", it is desired for users to select the HIGH button 705. When the image forming apparatus 10 is placed at one corner of a room, it is believed that many of persons approaching the image forming apparatus 10 are users of the image forming apparatus 10, so that the erroneous return will not occur so often. Accordingly, causing the image forming apparatus 10 to return from the power saving state at earlier timing is useful. Users are not required to wait for a longer time until the image forming apparatus 10 returns to the ordinary power state while they are kept standing in front of the image forming apparatus 10.

On the other hand, in a case where the image forming apparatus 10 is placed in a passageway, it is desired for users to select the LOW button 703. When the image forming apparatus 10 is placed in a passageway, it is difficult to determine whether a person approaching the image forming apparatus 10 is a pedestrian or a user of the image forming apparatus 10. Accordingly, delaying the timing at which the image forming apparatus 10 returns from the power saving state is useful to suppress the erroneous return from being caused by pedestrians.

In the present exemplary embodiment, the image forming apparatus 10 is configured to change the prescribed value Cx of the count value C when a user has selected the sensitivity of the human body detection sensor 600. Therefore, it becomes feasible to adjust the threshold value to be referred to in determining whether the user has stopped in front of the image forming apparatus 10. If the button selected by the user is the LOW button 703, the prescribed value Cx becomes a larger value and surely detecting a user who has stopped in front of the image forming apparatus 10 becomes feasible. Therefore, the image forming apparatus can be prevented from erroneously returning from the power saving state when a person walks slowly in the vicinity of the image forming apparatus.

Further, if the button selected by the user is the HIGH button 705, the prescribed value Cx becomes a immediately return from the power saving state at the moment when a user slows down the walking speed before stopping in front of the image forming apparatus 10. Therefore, the image forming apparatus 10 is surely brought into the ordinary power state before the user reaches the forward area of the image forming apparatus 10.

Figure 8:
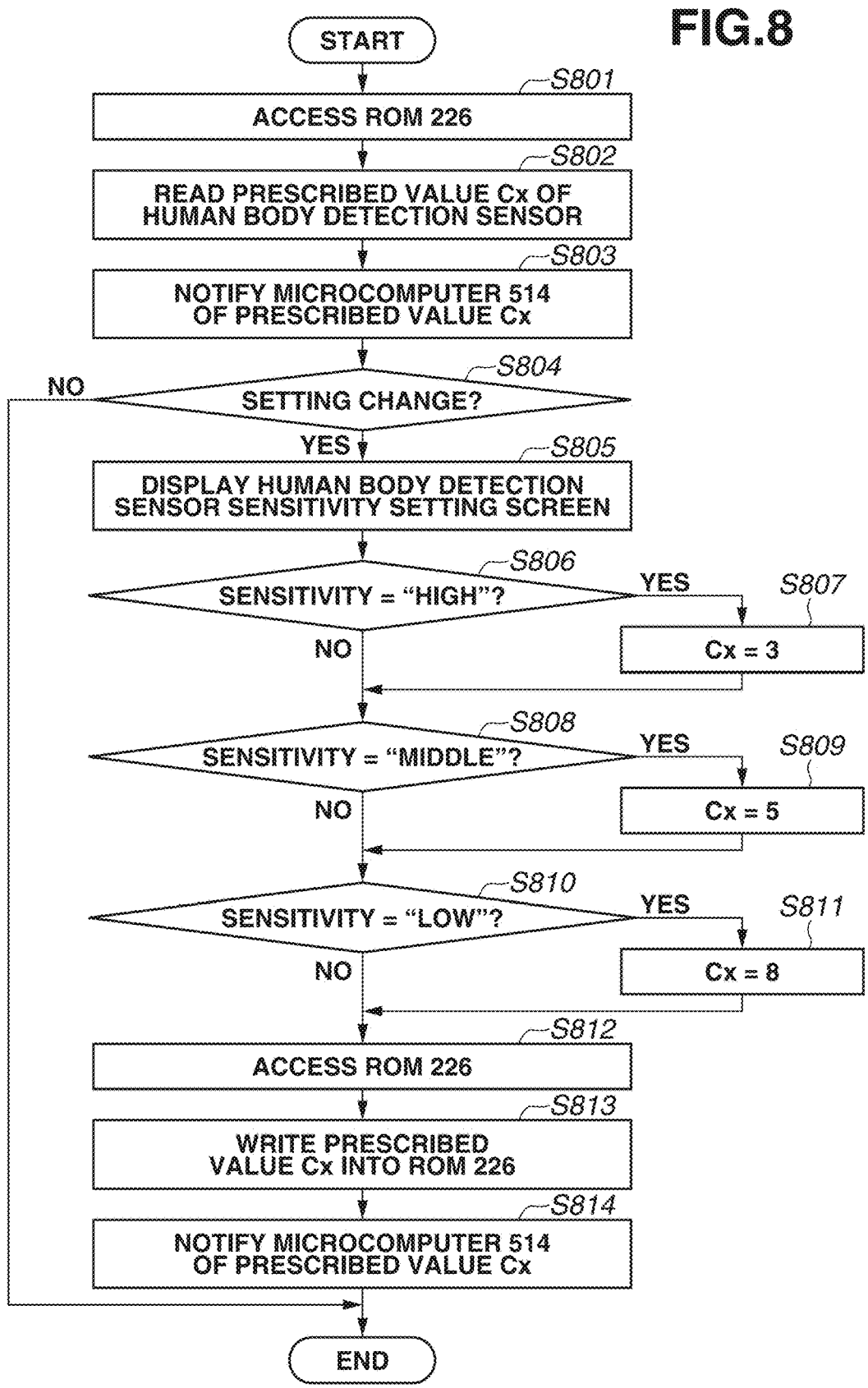
FIG. 8 is a flowchart illustrating processing performed by a CPU to change the sensitivity of the human body detection sensor.

FIG. 8 is a flowchart illustrating processing performed by the CPU 221 to change the sensitivity of the human body detection sensor 600.

First, in step S801, the CPU 221 accesses the ROM 226 in response to an activation of the image forming apparatus 10. Then, in step S802, the CPU 221 reads the prescribed value Cx of the human body detection sensor 600. Then, in step S803, the CPU 221 notifies the microcomputer 514 of the prescribed value Cx. Therefore, the microcomputer 514 sets the notified prescribed value Cx. Then, as illustrated in step S608 in FIG. 6, the microcomputer 514 determines whether the count value C is equal to or greater than the prescribed value Cx having been set.

Subsequently, in step S804, the CPU 221 determines whether a user has instructed to change the sensitivity of the human body detection sensor 600. If it is determined that changing the sensitivity of the human body detection sensor 600 has been instructed (Yes in step S804), then in step S805, the CPU 221 controls the microcomputer 514 in such a way as to display the sensitivity setting screen 700 on the LCD touch panel unit 524.

Then, if the CPU 221 determines that the HIGH button 705 has been selected on the sensitivity setting screen 700 (Yes in step S806), then in step S807, the CPU 221 sets the prescribed value Cx to 3. Further, if the CPU 221 determines that the MIDDLE button 704 has been selected on the sensitivity setting screen 700 (Yes in step S808), then in step S809, the CPU 221 sets the prescribed value Cx to 5. Further, if the CPU 221 determines that the LOW button 703 has been selected on the sensitivity setting screen 700 (Yes in step S810), then in step S811, the CPU 221 sets the prescribed value Cx to 8.

Next, in step S812, the CPU 221 accesses the ROM 226. Then, in step S813, the CPU 221 writes the prescribed value Cx having been set in step S807, S809, or S811 into the ROM 226. Then, in step S814, the CPU 221 notifies the microcomputer 514 of the prescribed value Cx written in the ROM 226. After the prescribed value Cx has been changed, the microcomputer 514 performs the above-mentioned determination processing in step S608 of FIG. 6 with reference to the prescribed value Cx.

Hereinafter, a second exemplary embodiment will be described in detail below. According to the above-mentioned first exemplary embodiment, the sensitivity of the human body detection sensor 600 can be set to any one of three stages (low, middle, and high). The second exemplary embodiment is characterized in that a desired sensitivity level of a scale bar 901 is selectable.

Figure 9:
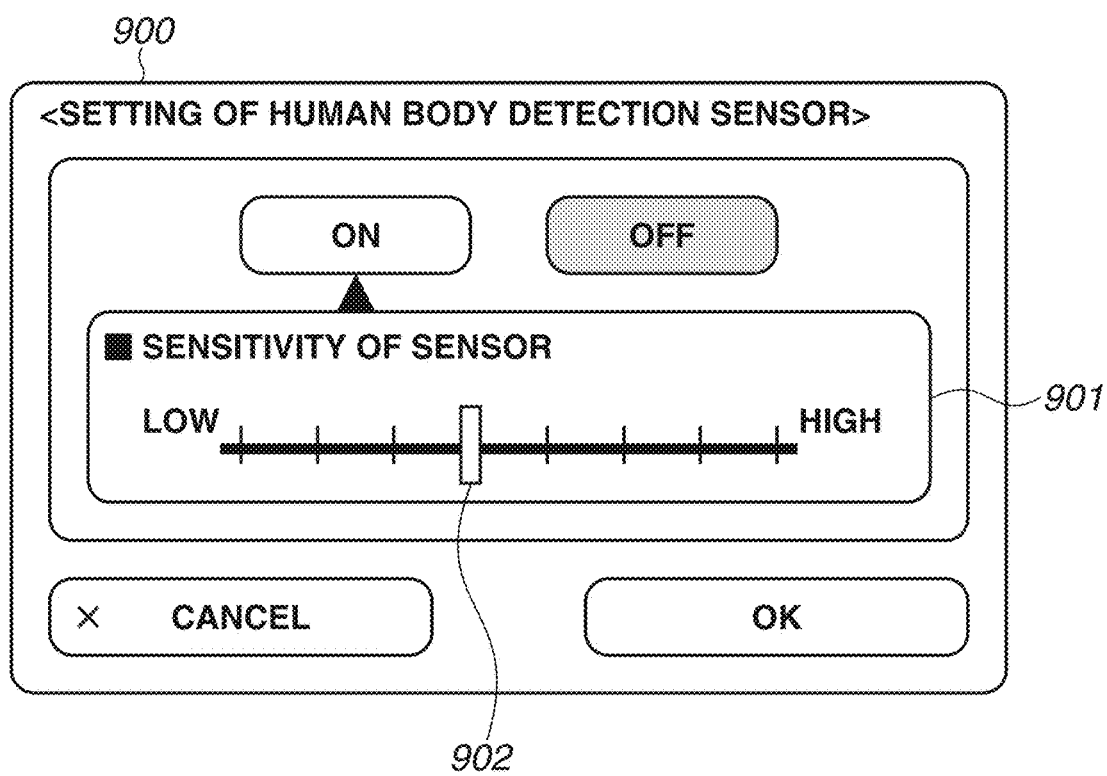
FIG. 9 illustrates a screen that allows a user to set the sensitivity of the human body detection sensor according to a second exemplary embodiment.

FIG. 9 illustrates a sensitivity setting screen 900 that includes the scale bar 901, which is operable to select the sensitivity of the human body detection sensor 600. In this case, it is feasible for a user to select the sensitivity of the human body detection sensor 600 by moving a selection bar 902. In the present exemplary embodiment, the scale bar 901 includes eight scale marks, so that the user can move the selection bar 902 to select any one of eight scale marks. Thus, it is feasible for the user to adjust the sensitivity of the human body detection sensor 600 to a desired value.

For example, when the selection bar 902 has been moved to a lowest sensitivity position of the scale bar 901 on the sensitivity setting screen 900 illustrated in FIG. 9, the prescribed value Cx to be compared with the count value C is 8. Accordingly, if a plurality of heat source pixels stays in the detection area A2 continuously for a period of time not shorter than 0.8 sec, the image forming apparatus 10 returns from the power saving state.

Further, when the selection bar 902 has been moved to a highest sensitivity position of the scale bar 901 on the sensitivity setting screen 900 illustrated in FIG. 9, the prescribed value Cx to be compared with the count value C is 1. Accordingly, if a plurality of heat source pixels stays in the detection area A2 continuously for a period of time not shorter than 0.1 sec, the image forming apparatus 10 returns from the power saving state.

Hereinafter, a third exemplary embodiment will be described. According to the above-mentioned first exemplary embodiment, the sensitivity of the human body detection sensor 600 can be set to any one of three stages (low, middle, and high). The third exemplary embodiment is characterized in that a user can input a desired prescribed value Cx to be compared with the count value C.

Figure 10:
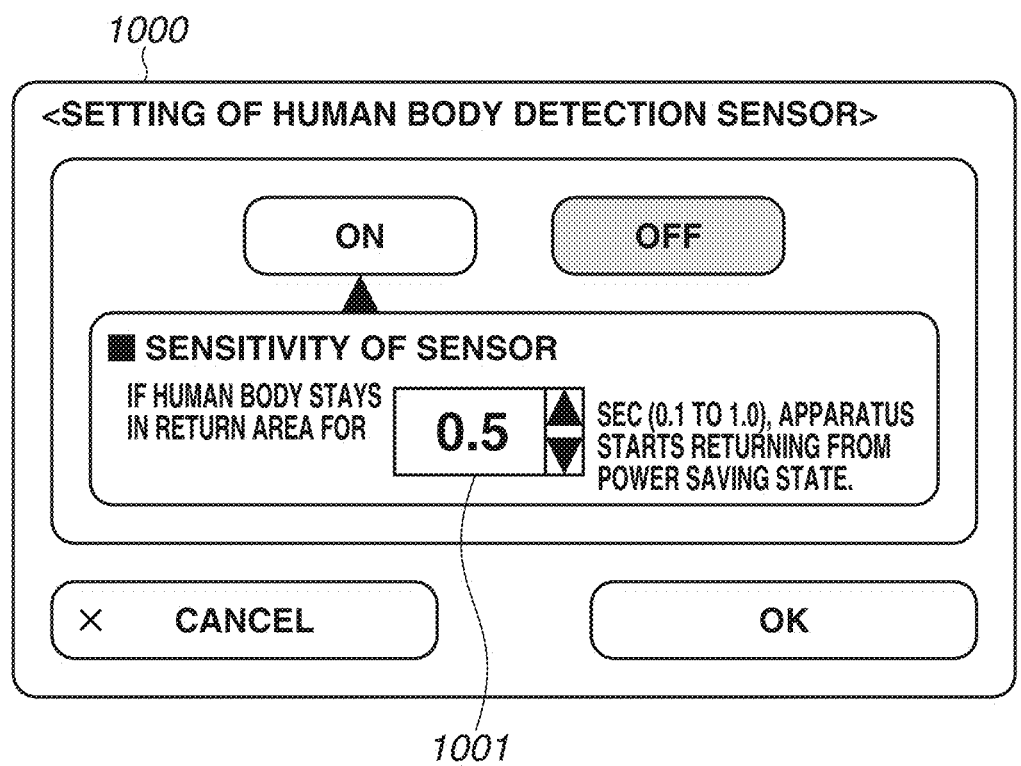
FIG. 10 illustrates a screen that allows a user to set the sensitivity of the human body detection sensor according to a third exemplary embodiment.
Figure 11A:
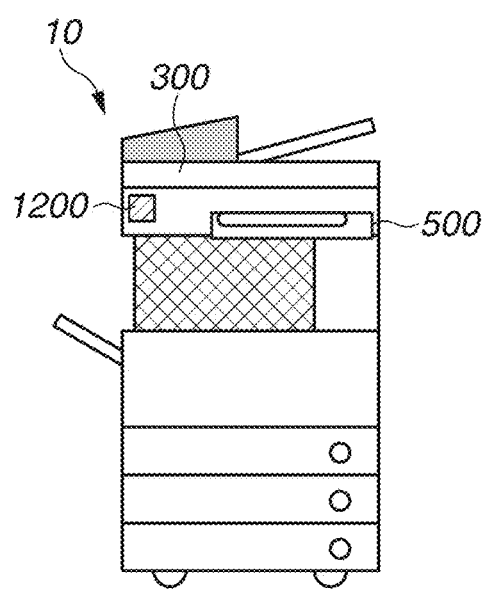
FIGS. 11A, 11B, 11C, and 11D illustrate a detection area of a human body detection sensor according to a fourth exemplary embodiment.
Figure 11C:
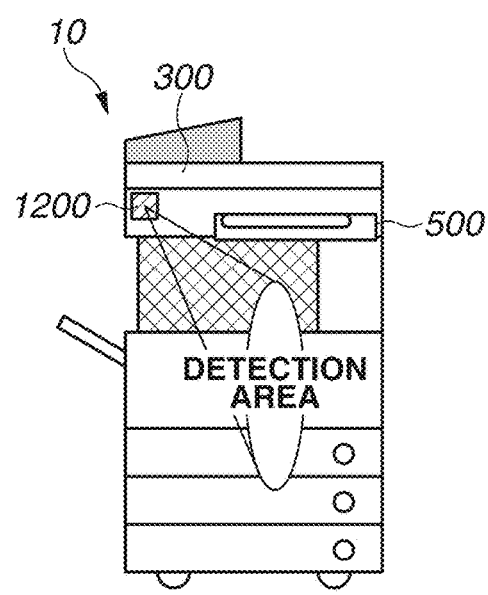
Figure 11B:
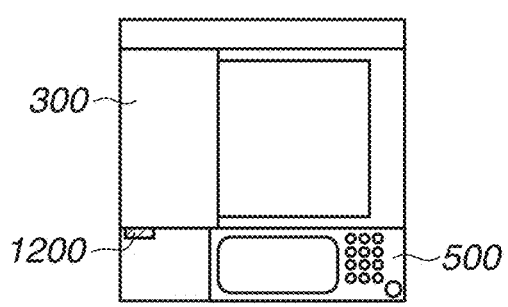
Figure 11D:
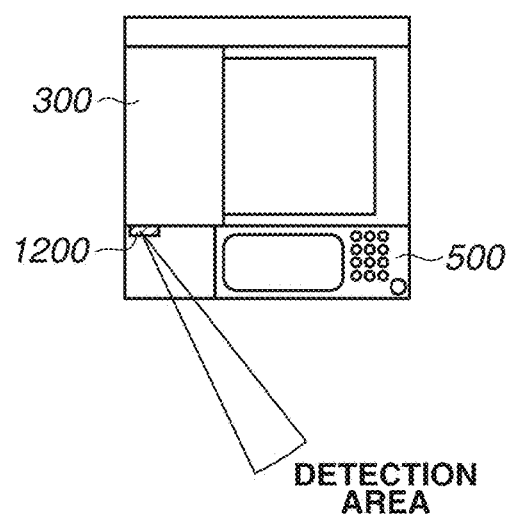

FIG. 10 illustrates a sensitivity setting screen 1000 that includes an input box 1001, which is operable to input a desired prescribed value Cx to be compared with the count value C, as the sensitivity of the human body detection sensor 600. In this case, it is feasible for a user to designate the prescribed value Cx to be compared with the count value C by inputting an arbitrary value between 0.1 sec and 1.0 sec in the input box 1001.

For example, if the value input in the input box 1001 of the sensitivity setting screen 1000 illustrated in FIG. 10 is 0.1, the prescribed value Cx to be compared with the count value C is 8. Accordingly, if a plurality of heat source pixels stays in the detection area A2 continuously for a period of time not shorter than 0.1 sec, the image forming apparatus 10 returns from the power saving state.

Further, if the value input in the input box 1001 of the sensitivity setting screen 1000 illustrated in FIG. 10 is 1.0, the prescribed value Cx to be compared with the count value C is 10. Accordingly, if a plurality of heat source pixels stays in the detection area A2 continuously for the period of time not shorter than 1.0 sec, the image forming apparatus 10 returns from the power saving state.

A fourth exemplary embodiment will be described below. In the first exemplary embodiment, an infrared ray array sensor including a plurality of infrared ray receiving elements is used for the human body detection sensor 600. The human body detection sensor according to the fourth exemplary embodiment is an infrared ray reflection sensor 1200. The rest of the configuration other than the human body detection sensor is similar to that described in the first exemplary embodiment and therefore redundant description thereof will be avoided.

The reflection sensor 1200 according to the fourth exemplary embodiment can output infrared rays and can receive infrared rays reflected from a target object. Then, the reflection sensor 1200 can output a detection value indicating the reception intensity (detection voltage) of the reflected infrared rays. The detection value obtained by the reflection sensor 1200 indicates the distance from the target object. The reflection sensor 1200 according to the fourth exemplary embodiment is not limited to the sensor that outputs infrared rays and receives infrared rays reflected from the target object. As another example, the reflection sensor 1200 according to the fourth exemplary embodiment may output acoustic waves and may receive reflected acoustic waves. If the reflection sensor 1200 is an acoustic wave sensor that can output acoustic waves, the sensor receives acoustic waves reflected from the target object and outputs a detection value representing the reception intensity of the received acoustic waves. The detection value obtained by the acoustic wave sensor indicates the distance from target object.

FIGS. 11A to 11D illustrate a detection area of the reflection sensor 1200 according to the fourth exemplary embodiment.

The reflection sensor 1200 is disposed on a front surface of the image forming apparatus 10 so that the detection range of the reflection sensor 1200 faces forward or obliquely downward.

FIGS. 12A, 12B, and 12C illustrate detection results obtained by the human body detection sensor when a human body has moved toward the image forming apparatus 10. FIGS. 12A, 12B, and 12C include side views located at the upper parts thereof, each illustrating a positional relationship between the image forming apparatus 10 and the human body. FIGS. 12A, 12B, and 12C include plan views located at the middle parts thereof, each illustrating the positional relationship between the image forming apparatus 10 and the human body. FIGS. 12A, 12B, and 12C include graphs located at the lower parts thereof, each illustrating detection results obtained by the reflection sensor 1200 at respective positions of the human body.

FIG. 12A illustrates a state where a human body has just entered the detection area of the reflection sensor 1200. When the human body has entered the detection area of the reflection sensor 1200, the reflection sensor 1200 detects a detection voltage VA that indicates the intensity of infrared rays reflected from the target object, as illustrated in the lower part of FIG. 12A. At this moment, the detection voltage VA does not exceed a predetermined voltage Vth. Therefore, the image forming apparatus 10 remains in the power saving state.

If the user further approaches the image forming apparatus 10 and almost reaches the detection area A2, the reflection sensor 1200 detects a detection voltage VB, which is higher than the detection voltage VA, as the intensity of infrared rays reflected from the target object, as illustrated in the lower part of FIG. 12B. At this moment, the detection voltage VB does not exceed the predetermined voltage Vth. Therefore, the image forming apparatus 10 remains in the power saving state.

If the user further approaches the image forming apparatus 10 and enters the detection area A2, the reflection sensor 1200 detects a detection voltage VC that indicates the intensity of infrared rays reflected from the target object, as illustrated in the lower part of FIG. 12C. The detection voltage VC is higher than the predetermined voltage Vth. Then, if it is determined that the detection voltage VC of the reflection sensor 1200 has exceeded the predetermined voltage Vth continuously for a predetermined time, the image forming apparatus 10 returns from the power saving state.

If the detection voltage of the reflection sensor 1200 is smaller than the predetermined voltage Vth, the microcomputer 514 determines that the target object is present in the detection area A1. Then, if the detection voltage of the reflection sensor 1200 becomes greater than the predetermined voltage Vth, the microcomputer 514 determines that the target object is present in the detection area A2. In the present exemplary embodiment, the image forming apparatus 10 does not immediately return from the power saving state when the target object is present in the detection area A2. However, the image forming apparatus 10 returns from the power saving state if the target object stays in the detection area A2 continuously for the predetermined time.

FIGS. 13A, 13B, and 13C illustrate detection results obtained by the human body detection sensor when a human body has passed in front of the image forming apparatus 10. FIGS. 13A, 13B, and 13C include side views located at the upper parts thereof, each illustrating a positional relationship between the image forming apparatus 10 and the human body. Further, FIGS. 13A, 13B, and 13C include plan views located at the middle parts thereof, each illustrating the positional relationship between the image forming apparatus 10 and the human body. Further, FIGS. 13A, 13B, and 13C include graphs located at lower parts thereof, each illustrating detection results obtained by the human body detection sensor at respective positions of the human body.

FIG. 13A illustrates a state where a pedestrian has just entered the detection area of the reflection sensor 1200. When the human body has entered the detection area of the reflection sensor 1200, the reflection sensor 1200 detects a detection voltage Va that indicates the intensity of infrared rays reflected from the target object, as illustrated in the lower part of FIG. 13A. At this moment, the detection voltage Va does not exceed the predetermined voltage Vth. Therefore, the image forming apparatus 10 remains in the power saving state.

When the pedestrian passes in front of the image forming apparatus 10, the reflection sensor 1200 detects a detection voltage Vb that indicates the intensity of infrared rays reflected from the target object, as illustrated in the lower part of FIG. 13B. At this moment, although the detection voltage Vb is higher than the predetermined voltage Vth, the period of time the detection voltage continuously exceeds the predetermined voltage Vth is shorter than the predetermined time. Therefore, the image forming apparatus 10 remains in the power saving state.

When the pedestrian goes out of the detection area of the reflection sensor 1200, the reflection sensor 1200 detects no detection voltage as illustrated in the lower part of FIG. 13C.

As mentioned above, when a human body passes in front of the image forming apparatus 10, the detection voltage exceeding the predetermined voltage Vth has not been detected continuously for the predetermined time. Therefore, the image forming apparatus 10 remains in the power saving state.

Figure 14:
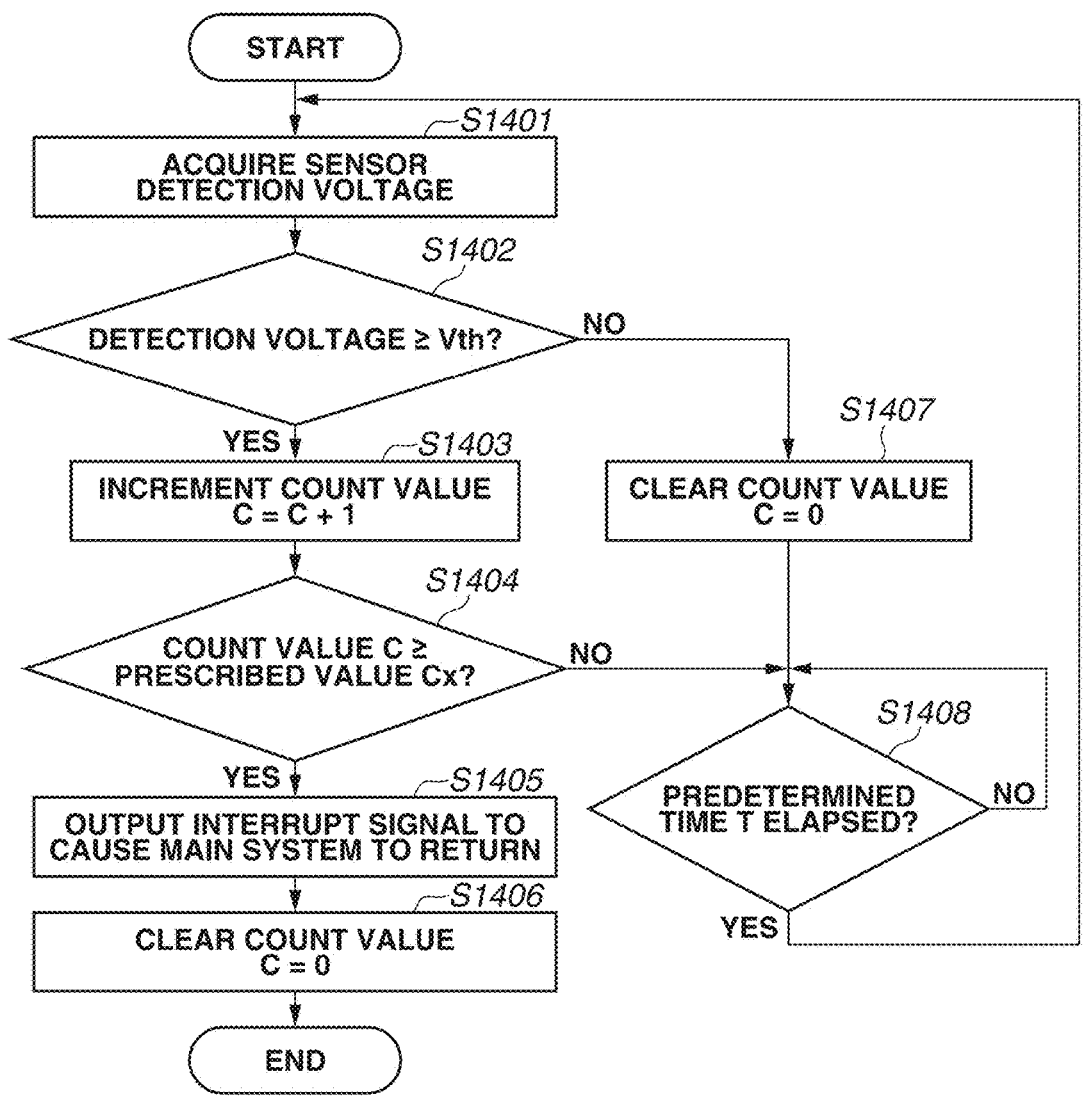
FIG. 14 is a flowchart illustrating determination processing performed by the microcomputer.

FIG. 14 is a flowchart illustrating determination processing performed by the microcomputer 514.

First, in step S1401, the microcomputer 514 acquires the detection voltage detected by the reflection sensor 1200. Then, in step S1402, the microcomputer 514 determines whether the acquired detection voltage is equal to or greater than the predetermined voltage Vth. If it is determined that the detection voltage is equal to or greater than the predetermined voltage Vth (Yes in step S1402), then in step S1403, the microcomputer 514 increments the count value C by one. If it is determined that the count value C is equal to or greater than the prescribed value Cx (Yes in step S1404), then in step S1405, the microcomputer 514 outputs the interrupt signal C and causes the image forming apparatus 10 to return from the power saving state. Then, in step S1406, the microcomputer 514 clears the count value C.

If it is determined that the count value C is less than the prescribed value Cx (No in step S1404), then in step S1408, the microcomputer 514 determines whether the predetermined time T has elapsed. If the microcomputer 514 determines that the predetermined time T has elapsed (Yes in step S1408), the microcomputer 514 performs detection voltage acquisition processing again in step S1401. The predetermined time T is, for example, 0.1 sec. The reflection sensor 1200 outputs infrared rays at the interval of time T. Although the predetermined time T is set to 0.1 sec in the present exemplary embodiment, the predetermined time T may be set to any value other than 0.1 sec. If the predetermined time T is reduced, the reflection sensor 1200 frequently outputs infrared rays. Therefore, electric power consumption of the reflection sensor 1200 increases. However, the number of pieces of data to be acquired becomes larger. In other words, accurately detecting the movement of a human body is feasible. On the other hand, if the predetermined time T is increased, the number of pieces of data to be acquired becomes smaller. Therefore, detecting the movement of a human body becomes difficult. However, electric power consumption of the reflection sensor 1200 can be reduced.

If the microcomputer 514 determines that the acquired detection voltage is less than the predetermined voltage Vth (No in step S1402), then in step S1407, the microcomputer 514 clears the count value C.

The prescribed value Cx to be compared with the above-mentioned count value C is changeable according to a user selection. More specifically, it is feasible for a user to set the sensitivity of the human body detection sensor 600 on the sensitivity setting screen illustrated in FIG. 7, FIG. 9, or FIG. 10. The prescribed value Cx can be changed based on a setting value of the sensitivity of the human body detection sensor 600.

In the above-mentioned exemplary embodiment, the prescribed value Cx to be compared with the count value C can be changed according to a user setting. However, the target to be changed in aspects of the present invention is not limited to the prescribed value Cx. For example, it is feasible to change the prescribed value G to be compared with the number of heat source pixels based on a user setting. Further, it is feasible to change predetermined voltage Vth to be compared with the detection voltage. Further, it is feasible to change the temperature difference Df to be compared with the calculated temperature difference D based on a user setting.

The image reading apparatus according to aspects of the present invention is not limited to the MFP described in the above-mentioned exemplary embodiment and may be any other image reading apparatus that has the scanner function. In other words, the image reading apparatus is not required to have the print function and the FAX function.

Aspects of the present invention may be applied to a system including a plurality of devices, such as an information processing apparatus, a router, and an image reading apparatus. Aspects of the present invention may be applied to an apparatus constituted by a single device (e.g., an image reading apparatus, a copying machine, or a facsimile apparatus).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-138899, filed Jul. 10, 2015, which is hereby incorporated by reference herein in its entirety.

What is claimed is:

1. An image forming apparatus including at least a first power state and a second power state that is lower in electric power consumption than the first power state, the apparatus comprising:
   a human body detection sensor which includes a plurality of elements;
   a power controller which shifts the image forming apparatus to the first power state from the second power state based on time that has elapsed in a state that output values that are not less than a predetermined value are output by a predetermined number of elements or more;
   a user interface which receives a predetermined user operation relating to a setting of the human body detection sensor, and
   a controller which changes a prescribed value to be compared with the time that has elapsed in the state that the output values that are not less than the predetermined value are output by the predetermined number of elements or more in accordance with the received user operation.

2. The image forming apparatus according to claim 1, wherein the user interface is a display unit which displays a selection screen includes a plurality of selectable items, each of the plurality of selectable items being a sensitivity level of the human body detection sensor, and wherein the controller changes the prescribed value corresponding to the selected item.

3. The image forming apparatus according to claim 2, wherein the number of the selectable items included in the selection screen is at least three.

4. The image forming apparatus according to claim 1, wherein the user interface is a display unit which displays a scroll bar, which can be moved, indicating a sensitivity level of the human body detection sensor, and wherein the controller changes the prescribed value corresponding to a current position of the scroll bar.

5. The image forming apparatus according to claim 1, wherein the user interface is a display unit which displays a screen includes a designation part enabling a user to designate time, and
   wherein the controller changes the prescribed value corresponding to the designated time.

6. The image forming apparatus according to claim 1, wherein the power controller shifts the image forming apparatus to the first power state from the second power state based on the time that has elapsed in the state that the output values that are not less than the predetermined value are output by the predetermined number of elements or more and the prescribed value changed by the controller.

7. The image forming apparatus according to claim 1,
   wherein the user interface further receives another predetermined operation to prohibit the power state of the image forming apparatus from being shifted based on the sensing result of the human body detection sensor.

8. The image forming apparatus according to claim 1, wherein the human body detection sensor is an infrared sensor that receives infrared rays.

9. The image forming apparatus according to claim 8, wherein the infrared sensor is an array sensor including the plurality of elements disposed in a lattice pattern to receive infrared rays.

10. The image forming apparatus according to claim 1, further comprising a printing unit which prints an image on a paper.

11. A method for controlling an image forming apparatus having a human body detection sensor which includes a plurality of elements and including at least a first power state and a second power state that is lower in electric power consumption than the first power state, and, the method comprising:

shifting the image forming apparatus to the first power state from the second power state based on a time that has elapsed in a state that output values that are not less than a predetermined value are output by a predetermined number of elements or more;

receiving a predetermined user operation relating to a setting of the human body detection sensor; and changing a prescribed value to be compared with the time that has elapsed in the state that the output values that are not less than the predetermined value are output by the predetermined number of elements or more in accordance with the received user operation.

* * * * *